United States Patent [19]
Hirohata

[11] Patent Number: 5,008,693
[45] Date of Patent: Apr. 16, 1991

[54] CAMERA

[75] Inventor: Michio Hirohata, Kanagawa, Japan

[73] Assignee: Canon Kabushiki Kaisha, Tokyo, Japan

[21] Appl. No.: 409,387

[22] Filed: Sep. 19, 1989

[30] Foreign Application Priority Data

| Sep. 21, 1988 | [JP] | Japan | 63-237404 |
| Sep. 26, 1988 | [JP] | Japan | 63-240189 |
| Oct. 25, 1988 | [JP] | Japan | 63-269041 |
| Dec. 1, 1988 | [JP] | Japan | 63-304420 |
| Dec. 1, 1988 | [JP] | Japan | 63-304421 |
| Dec. 1, 1988 | [JP] | Japan | 63-304422 |
| Dec. 1, 1988 | [JP] | Japan | 63-304423 |
| Dec. 28, 1988 | [JP] | Japan | 63-332176 |
| Dec. 28, 1988 | [JP] | Japan | 63-332207 |

[51] Int. Cl.⁵ ............................................. G03B 1/00
[52] U.S. Cl. ................................................... 354/214
[58] Field of Search ............. 354/212, 213, 214, 173.1

[56] References Cited

U.S. PATENT DOCUMENTS

| 1,357,391 | 11/1920 | Freytag | 354/212 X |
| 3,377,936 | 4/1968 | Goshima et al. | 354/212 |
| 4,332,453 | 6/1982 | Seely et al. | 354/288 |
| 4,516,843 | 5/1985 | Ohmura | 354/173.1 |
| 4,610,522 | 9/1986 | Tobioka et al. | 354/214 X |

FOREIGN PATENT DOCUMENTS

| 56-115149 | 9/1981 | Japan . |
| 57-179828 | 11/1982 | Japan . |
| 58-192628 | 12/1983 | Japan . |
| 60-10298 | 3/1985 | Japan . |

Primary Examiner—Brian W. Brown
Attorney, Agent, or Firm—Fitzpatrick, Cella, Harper & Scinto

[57] ABSTRACT

A camera of the kind arranged to wind a film onto a spool in the reverse winding direction comprises a spool for taking up the film in the reverse winding direction, a guide roller, and a position changing member for changing a position of the spool to cause the film to be inserted and pinched between the spool and the guide roller so that the film is advanced by a driving force of the spool.

41 Claims, 14 Drawing Sheets

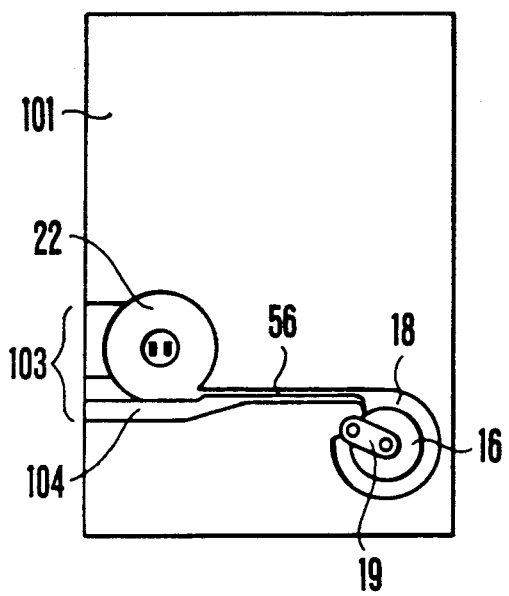
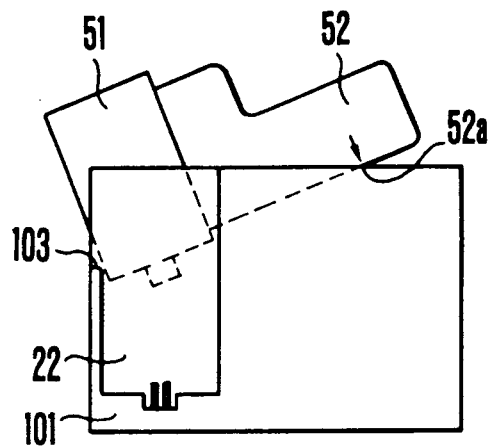
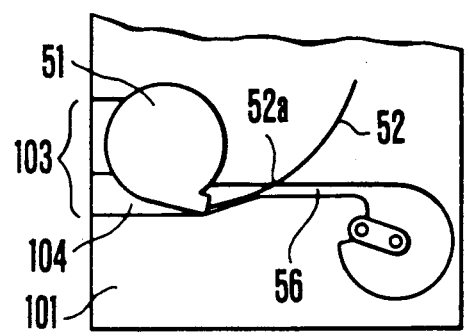
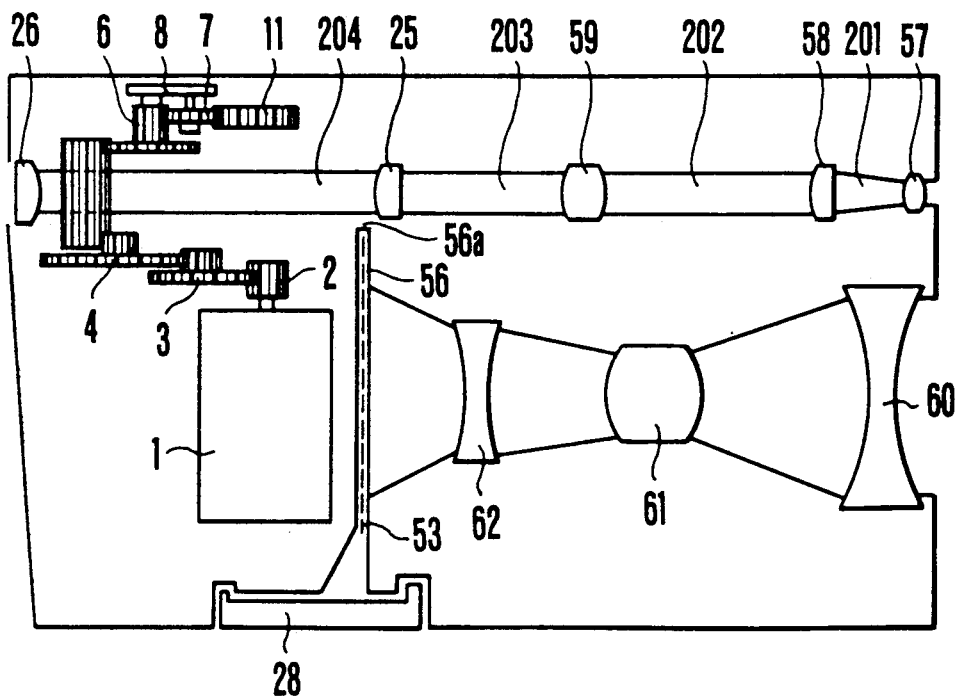

F I G. 16
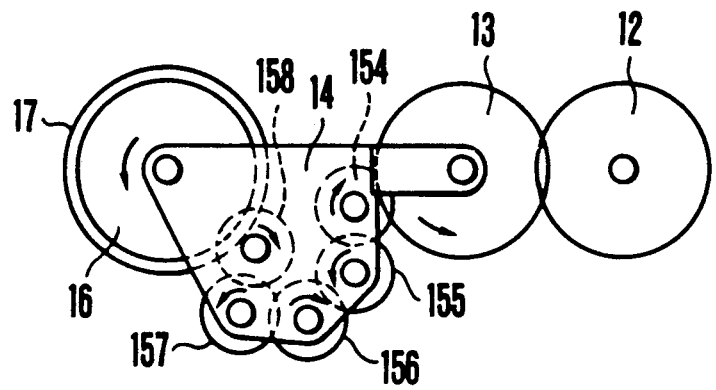
F I G. 21
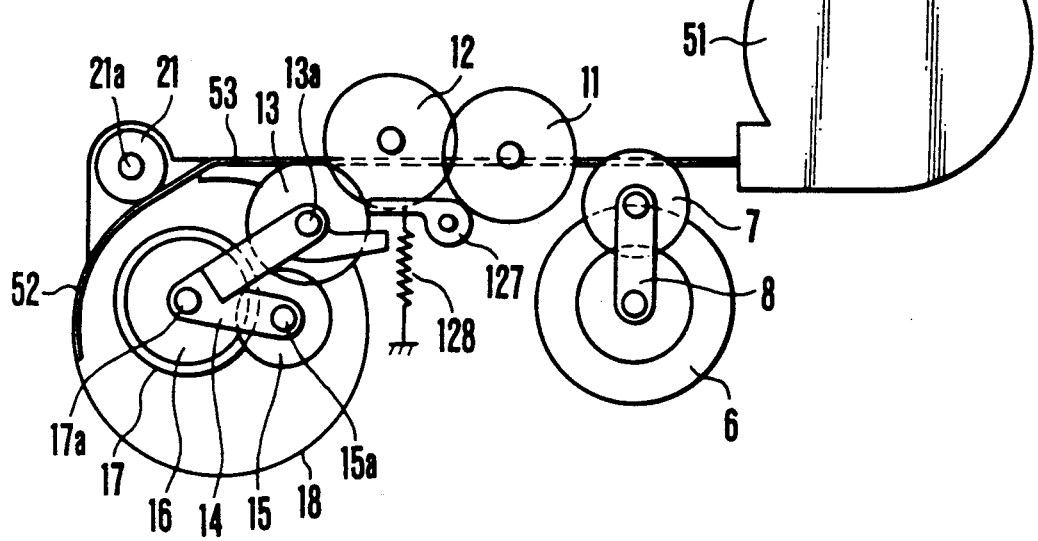
F I G. 22
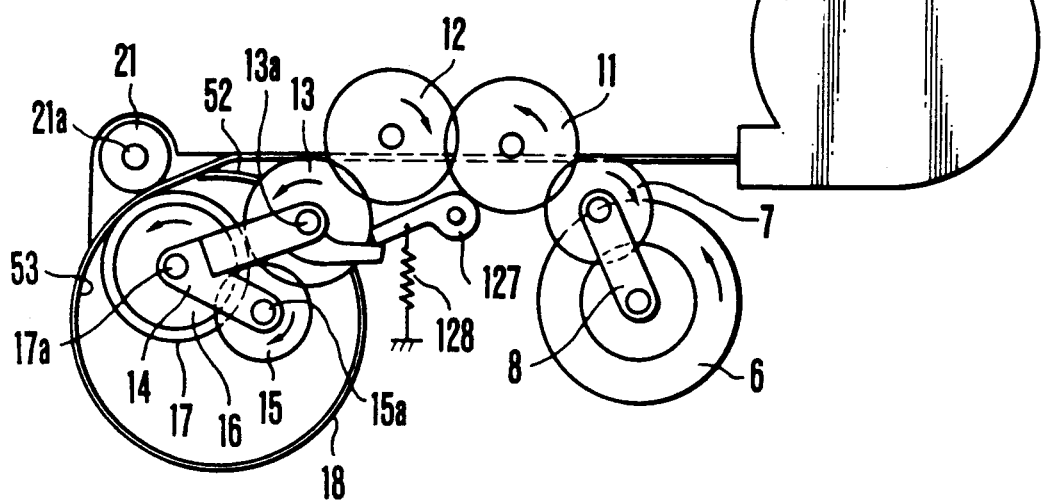

CAMERA

BACKGROUND OF THE INVENTION

1. Field of the Invention

This invention relates to an improvement in a camera of the kind arranged to wind a roll of film onto a spool in the reverse winding direction.

2. Description of the Related Art

Heretofore, many of the cameras of the kind using a brownie type film have been arranged up the film onto a spool with a spool chamber disposed behind an aperture part which has a film exposing aperture. Some of the cameras using 35 mm film are also arranged to wind the film in this manner. The reason for this is as follows: The lateral size of the camera body is determined by the size of a cartridge chamber which is provided for stowing a film cartridge, that of the aperture part and that of the spool chamber. The lateral size of the camera body, therefore, can be lessened with the spool chamber arranged behind the aperture part. The arrangement permits reduction in size of the camera for better portability.

The conventional camera of the kind having the spool chamber disposed behind the film exposing aperture is arranged to take up the film onto the spool disposed within the spool chamber by winding the film in the reverse winding direction. This makes it difficult to provide the camera with an automatic loading mechanism whereby, with the leader part of the film pulled out from the cartridge to a given position inside the spool chamber, for example, some frame portions of the film are automatically taken up onto the spool to make the camera ready for photographing from a first frame when the back cover, of the camera is closed after film loading, because the leader part of the film is curled in the forward winding direction of the film. In the case of the film winding method in which the film is wound in the reverse winding direction, the film cannot be taken up onto the spool as the film leader part is urged in the spool chamber to curve toward the outside in the radial direction of the spool chamber. It should be noted that "the reverse winding direction" means that the film is wound onto the spool with an emulsion surface of the film facing outside.

Further, in the case of a camera of this kind, the size of the camera body tends to increase in the direction of its photo-taking optical axis. The size in this direction must also be lessened for a compact camera.

SUMMARY OF THE INVENTION

This invention is directed to the solution of the above-stated problem of the conventional camera.

It is therefore a general object of the invention to provide a camera arrangement which is capable of adequately performing automatic film loading and is highly suited for a camera which is of the kind arranged to wind, a film onto a spool in the reverse winding direction. To attain this object, a camera which is of the above-stated kind comprises a spool for taking up the film in the reverse winding direction; a guide roller; and position changing means for changing a position of the spool to cause the film to be inserted and pinched between the spool and the guide roller so that the film is advanced by a driving force of the spool.

The above and other objects and features of the invention will become apparent from the following detailed description of embodiments thereof taken in connection with the accompanying drawings.

BRIEF DESCRIPTION OF THE DRAWINGS

FIG. 2 is a plan view showing the essential parts of the camera of FIG. 1. FIG. 3 is a sectional view showing the same camera as in a state of having a film cartridge being inserted. FIG. 4 is a plan view showing the action of an obliquely formed rear wall face of the same camera. FIG. 5 shows the arrangement of a viewfinder optical system of the same camera. FIGS. 15 and 16 show examples of modification of the mechanism of FIG. 14.

FIGS. 21 to 24 are plan views showing a film winding and rewinding mechanism arranged according to this invention as a further embodiment thereof, in which FIG. 21 shows the mechanism in a state of being loaded with a film; FIG. 22 shows the mechanism in the process of advancing the film; FIG. 23 shows the mechanism in a state of tightening the film wound; and FIG. 24 shows the mechanism having the film wound in a coiled state.

DETAILED DESCRIPTION OF THE PREFERRED EMBODIMENTS

The details of this invention are as described below with reference to the accompanying drawings which show by way of example some embodiments of the invention.

Figure 1:
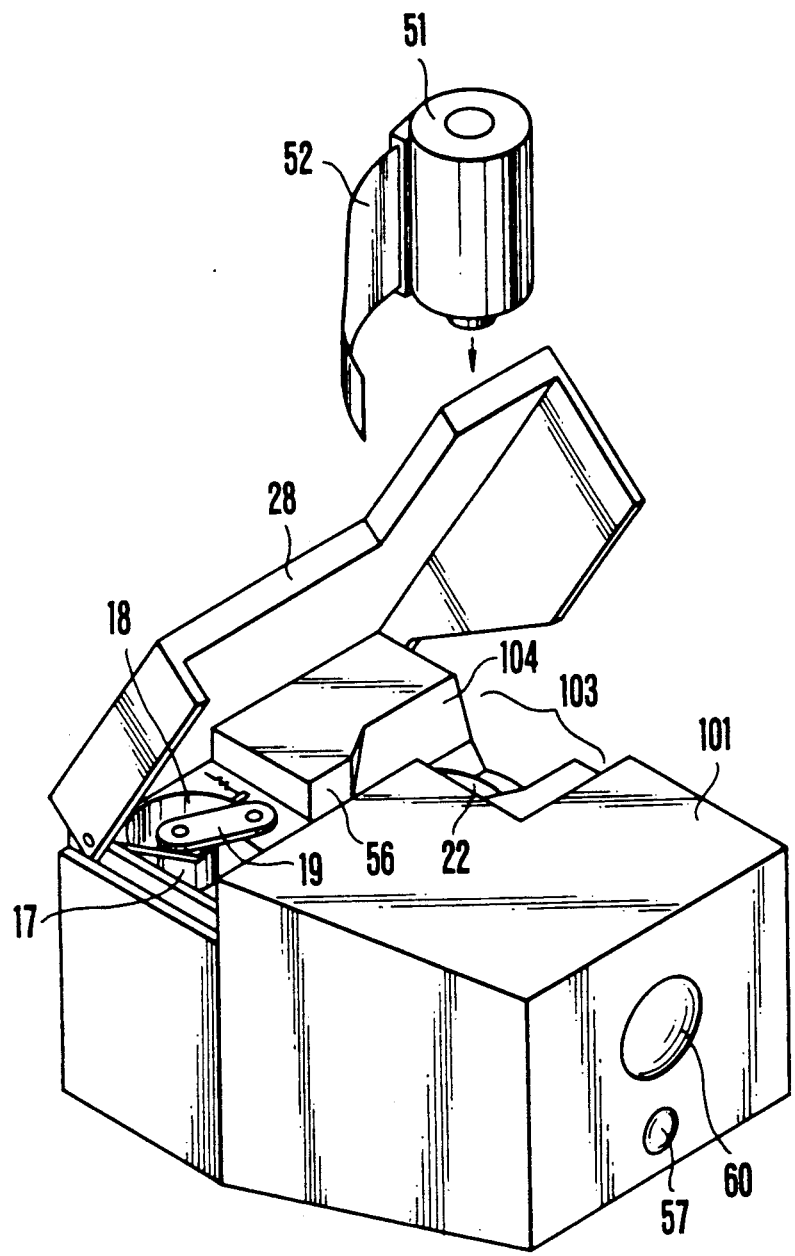
FIG. 1 is an oblique view showing the appearance of a camera embodying this invention.

FIG. 1 is an oblique view showing the appearance of a camera embodying this invention. FIG. 2 is a plan view schematically showing the parts of the same camera essentially related to this invention. In FIGS. 1 and 2, a camera body 101 is shown upside down in a state in which a bottom lid 28 for replacing a film has been opened. A cartridge chamber 22 is arranged to stow a film cartridge 51. A spool chamber 18 is arranged to stow a spool 17. A groove part 56 is arranged to form a film transport route leading from the cartridge chamber 22 to the spool chamber 18. With the bottom lid 28 opened, these parts 22, 18 and 56 which are disposed on the bottom side inside the camera body 101 are also opened respectively to permit the camera to be loaded with a roll of film by dropping the film cartridge 51 into the chamber 22 from the bottom part of the camera body 101. When the bottom lid 28 is closed, an automatic film loading operation is performed through a film winding mechanism which will be described later herein. Further, the film transport groove part 56 is provided with a light-blocking rear wall face, and a film exposing aperture which is not shown but is disposed in front of the film transport groove part 56.

The spool 17 is arranged to be rotatable and is supported by a spool arm 19. When the bottom lid 28 is opened, a gap is provided for inserting the film between the spool 17 and the inside wall face of the spool chamber 18. Since the winding method in which the film is wound in the reverse winding direction is employed for the camera, a cutaway part formed in the leader part 52 of the film is arranged to be opposed to the bottom lid 28.

The camera body 101 is provided with a cutaway part 103 which is somewhat wider than the diameter of the film cartridge 51 and which is formed in one side wall of the camera body 101 in its bottom part on the side of the film cartridge chamber 22. The depth of the cutaway part 103 is about ⅓ of the total depth of the cartridge chamber 22. The bottom face of the cutaway part 103 is located at a level lower than the open end edge of the groove part 56.

Further, a rear wall 104 of the cutaway part 103 is cut out as far as a point behind the groove part 56 and is formed in a slanting shape which spreads backward to become wider accordingly as it is closer to the bottom part. This slanting rear wall 104 is connected to the rear wall of the groove part 56 as shown in FIG. 1.

In other words, as shown in FIG. 3, with the cartridge 51 inserted sidewise along the cutaway part 103 without dropping it directly into the cartridge chamber 22, the side edge of the leader part 52 of the film abuts on the groove part 56 to bring the cartridge 51 naturally into a slanting posture as the bottom face of the cutaway part 103 is located lower than the opening end edge of the groove part 56.

In that instance, since the camera is shown upside down, the film leader part 52 abuts on the opening end edge of the groove part 56 only at one point 52a of the upper end edge thereof. A portion of the film leader part 52 located further forward than this point 52a is in a state of being curled outward from the bottom part of the camera body 101. Meanwhile, a portion of the film cartridge 51 is left outside the camera body 101.

In inserting the cartridge 51, the curled state of the leader part 52 causes a film part near the exit opening of the cartridge 51 to be curved backward from a film exposing position. However, this curved film part leans and is then guided downward by the wall 104 to have the film leader part 52 naturally guided to the groove part 56. Further, as shown in FIG. 4, the elastic deforming force of the film leader part 52 brought about by the guiding action of the slanting rear wall 104 causes the film cartridge 51 to turn a little clockwise as viewed in FIG. 4. This shifts the point 52a of the leader part 52 at which it is in contact with the groove part 56 toward the fore end of the leader part 52. This, together with the advantageous effect of the cutaway part 103, facilitates the film loading operation of the camera.

Under this condition, when the cartridge 51 is pushed to straighten it, the cartridge pushing force is concentratedly applied to the point 52a at which the film leader part 52 is abutting on the opening end edge of the groove part 56. As a result, the leader part 52 is smoothly deformed and corrected to allow it to be fitted into the groove part 56. At the same time, the film cartridge 51 is pushed down into the cartridge chamber 22.

After loading, the film pulled out from the cartridge 51 is taken up onto the spool 17 in the spool chamber 18 by coming through the film transport groove part 56 which is formed in an inverted U-shape inside the camera body 101 and is completely shielded from light with the exception of the film exposing aperture part. As shown in FIG. 5, a viewfinder optical system has its optical paths 201, 202, 203 and 204 arranged a little above the upper end of the light blocking wall part 56a of the film transport groove part 56. This light blocking wall part 56a is arranged to shield the film from the light of the viewfinder optical paths. The photo-taking optical system of the camera is a zoom lens consisting of lenses 60, 61 and 62. Therefore, the viewfinder optical system is a real image type viewfinder system which is arranged to form an image twice. The viewfinder optical system comprises an objective lens 57 which is disposed inside the lens barrel of the photo-taking optical system at a fore end part of the lens barrel; a first field lens 58 which is positioned to form an image obtained by the objective lens 57; a re-imaging lens 59 which is arranged to re-form the image by shifting its position according to a magnification varying operation; a second field lens 25 which is arranged in a position close to the second image forming point; and an eyepiece 26 which is provided for sighting the secondary image in a magnified state. The viewfinder optical system is disposed above and close to the optical axis of the photo-taking optical system as shown in FIG. 5 and also in FIG. 12 for the purpose of lessening the parallax of the optical system. Further, the objective lens 57 is disposed at the fore end of the lens barrel to avoid the shading by the lens barrel.

Figure 6:
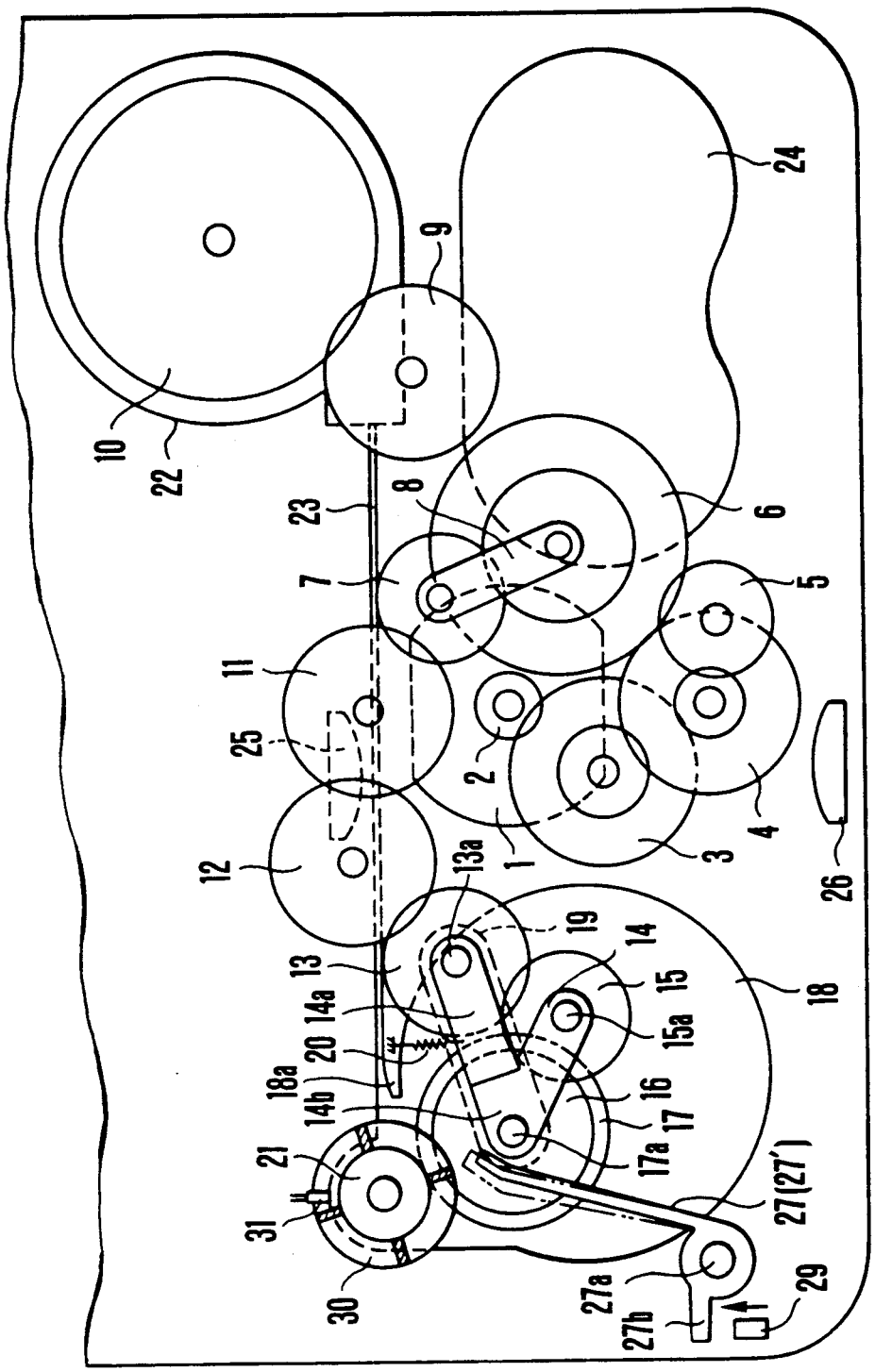
FIG. 6 is a plan view showing the film winding and rewinding mechanism of the same camera.
Figure 7:
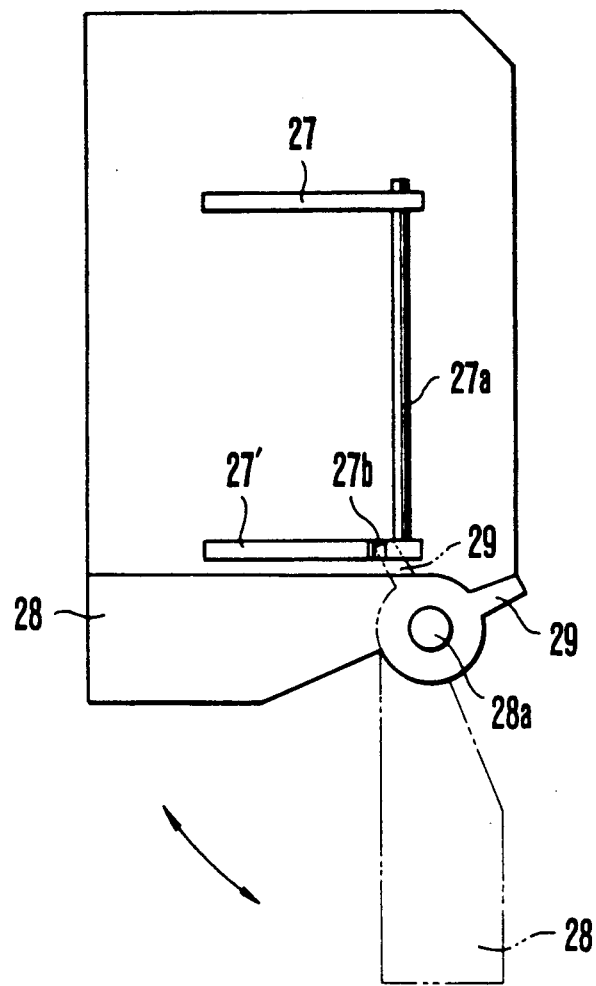
FIG. 7 is a side view showing the mechanism of FIG. 6.
Figure 12:
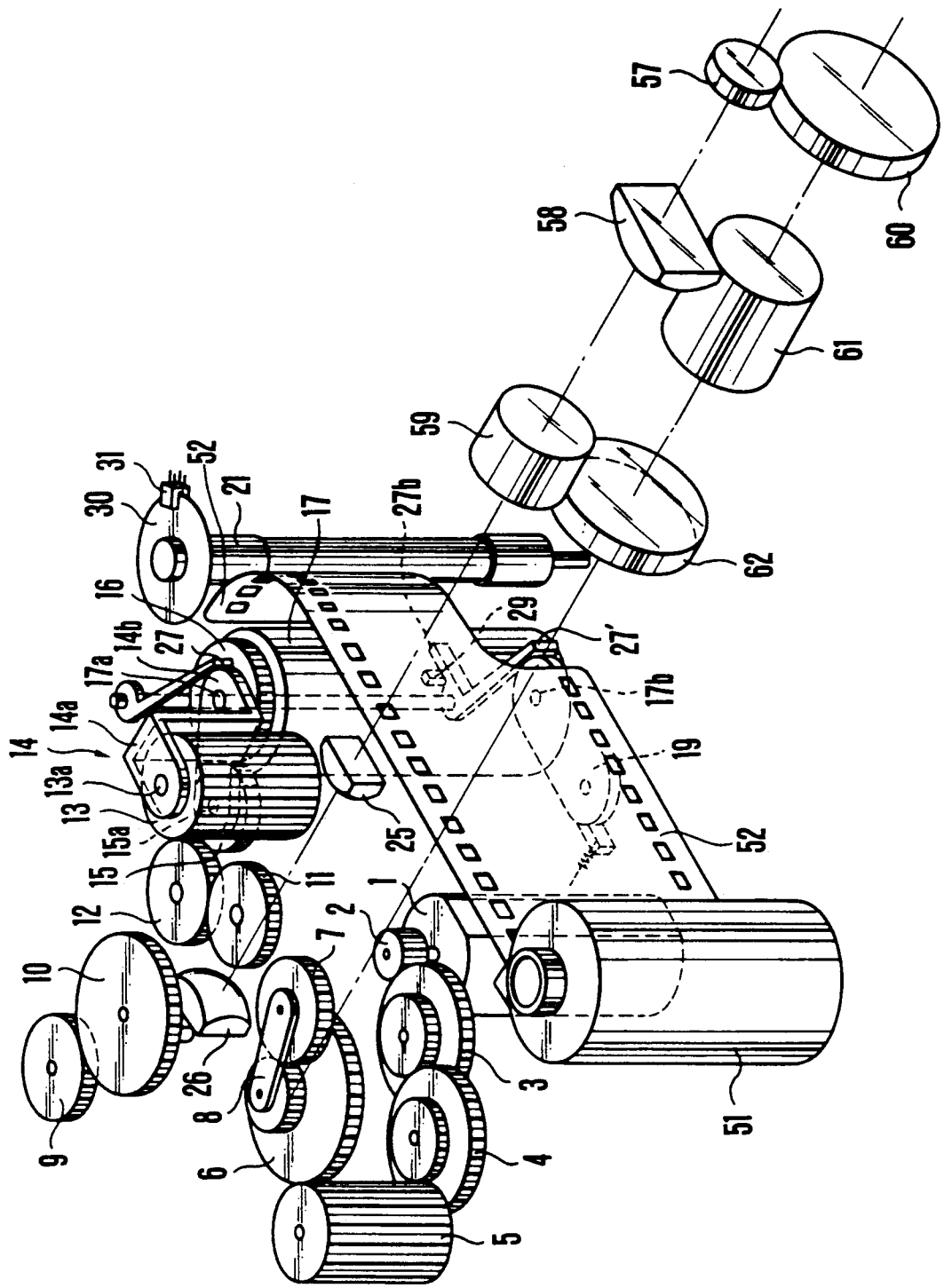
FIG. 12 is an exploded oblique view showing the camera of FIG. 1.

FIG. 6 shows in a plan view the film winding and rewinding mechanism of the camera of FIG. 1. FIG. 7 shows it in a side view and FIG. 12 in an exploded oblique view. Referring to FIGS. 6 and 12, a motor 1 is provided for winding and rewinding the film. The motor 1 is arranged to rotate a pinion 2 and is connected via the pinion 2 to reduction gears 3 and 4 which consist of large and small gears; an idle gear 5; a reduction gear 6 which consists of large and small gears; and a planet gear 7 of a film winding and rewinding planetary gear mechanism which forms a winding-rewinding clutch and uses the small gear of the reduction gear 6 as a sun gear.

When the motor 1 rotates clockwise, the reduction gear 6 rotates also clockwise. The clockwise rotation of the reduction gear 6 causes a first planet lever 8 of the winding and rewinding planetary gear mechanism to turn clockwise. This connects the planet gear 7 to the idle gear 9 and a rewinding fork gear 10. The film is rewound by this.

When the motor 1 rotates counterclockwise, the reduction gear 6 also rotates counterclockwise. This in turn causes the planet lever 8 to turn counterclockwise toward its position as shown in FIG. 6. As a result, idle gears 11 and 12 are connected to the planet gear 7 to rotate counterclockwise a sun gear 13 which is included in a planetary gear mechanism provided for a spool. The counterclockwise rotation of the spool sun gear 13 causes, via a spool idle gear 15 disposed on a spool planet lever 14, a spool planet gear 16 to rotate also counterclockwise.

Figure 13:
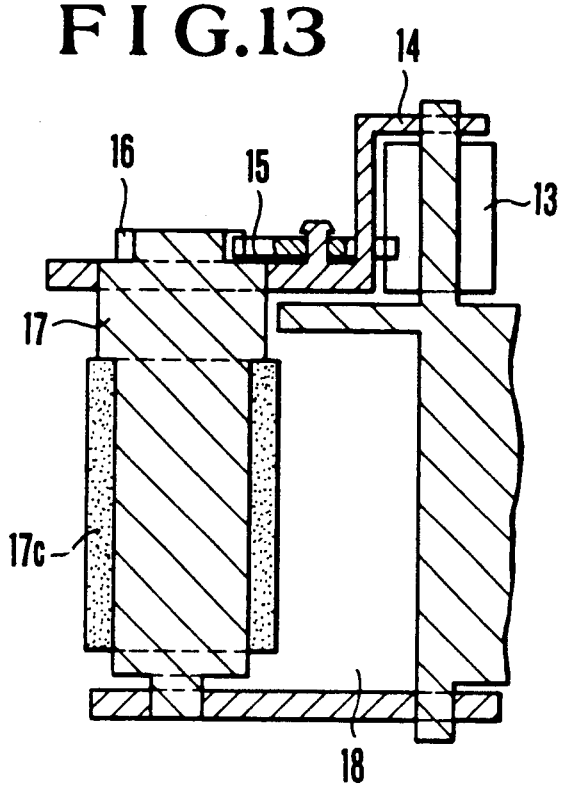
FIG. 13 is a longitudinal section showing the spool part of the mechanism of FIG. 6.

The sun gear 13 which is provided for the spool has a long trunk and is rotatable around a shaft 13a. The sun gear 13 for the spool engages the idle gear 12 at its upper part and engages the idle gear 15 for the spool at a lower part thereof. The spool 17 is formed in a cylindrical shape suited for winding the film and is disposed inside the spool chamber 18. The spool planet gear 16 which is secured to the upper end of the spool 17 engages the spool idle gear 15. The spool planet lever 14 is arranged in the spool planetary gear mechanism to cause the spool planet gear 16 to turn around the shaft 13a of the spool sun gear 13. The planet lever 14 for the spool has an upper arm part 14a pivotally mounted on the shaft 13a of the spool sun gear 13 and a lower arm part 14b pivotally mounted on the shaft 15a of the spool idle gear 15. In other words, the spool 17 is a movable spool which is arranged to be revolvable on the shaft 13a of the spool sun gear 13 inside the spool chamber 18 while the spool 17 rotates for the film winding purpose. The center of rotation of the spool 17 is located on a line obtained by extending the film surface. A spring 20 is arranged between the camera body 101 and the spool planet lever 14 to constantly push the spool 17 against a vertically long guide roller 21 which is opposed to the outside wall of the spool 17 in the neighborhood of the entrance of the spool chamber 18 and which has a rotational center on a line extending from a film surface 23 to be described later. The position of the shaft 13a of the sun gear 13 and a distance between the shaft 13a and the shaft 17a of the spool 17 are determined in such a way as to have the spool 17 gradually move to the center of the spool chamber 18 accordingly as the coil diameter of film increases on the spool. A support lever 19 is disposed between the lower spool shaft 17b of the spool 17 and the lower part of the shaft 13a of the spool sun gear 13. The spool planet lever 14 and the support lever 19 jointly carry and support the spool 17 from above and below to prevent the spool 17 from being slanted by film winding. Further, to ensure that the film 53 is conveyed without any loss, the outer circumferential face of the guide roller 21 and that of the spool 17 are coated with a rubber friction material or the like, such as a friction member 17c as shown in FIG. 13.

In FIG. 6, a reference numeral 23 denotes a film surface to be exposed to light by the camera. A battery chamber 24 containing a power source battery is disposed behind the film cartridge chamber 22. The eyepiece 26 and the second field lens 25 of the viewfinder optical system are arranged to avoid the film winding and rewinding gear trains in such a way as to permit reduction in size of the camera.

In other words, a layout to have the spool chamber 18, the motor 1 and the battery chamber 24 behind the film surface to be exposed enables the width of the camera body to be narrowed by shifting the position of the spool 17 backward. A space which exists behind the film cartridge chamber 22 of the camera and which is not usable for an optical purpose is effectively utilized for a gear chamber accommodating the motor 1 and the gear trains for the film winding and rewinding power transmission as well as for the battery chamber 24. The layout thus permits reduction in size of the camera.

Further, the efficiency of power transmission is enhanced by shortening distances between the motor 1 and the spool chamber 18 and between the motor and the rewinding fork and by simplifying the arrangement of the film winding and rewinding mechanism. This advantage is derived from obviation of the necessity of using redundant gears for space earning.

The size of the spool chamber is smaller than a layout of having a motor disposed inside the spool chamber. Therefore, compared with such a layout, the camera protrudes to a less degree backward from the film surface. This also contributes to reduction in size.

Automatic film loading of the camera now will be described. The fore end of the film 53 is first manually pulled out to a position to be readily pinched between the spool 17 and the guide roller 21. Then, when the spool 17 rotates counterclockwise, the film is moved into the spool chamber 18 by a frictional force to cause its forwardly curled leader part to be wound onto the spool 17 in the reverse winding direction. In this instance, the film can be taken up onto the spool without recourse to the use of the perforations provided in the film.

In loading the camera body with the film by dropping the latter, the fore end part of the film cannot be fitted in between by dropping it from the lower side of the camera body, if the spool 17 and the guide roller 21 are in pressed contact with each other.

To solve this problem, the camera is arranged to have the spool 17 moved away from the guide roller 21 toward the center of the spool chamber 18 against the urging force of the spring 20 in response to an opening movement of the bottom lid 28 which is opened and closed when the film is replaced. This provides a gap between the spool 17 and the guide roller 21 for insertion of the fore end part of the film. The details of the mechanism provided for this purpose are as follows:

Referring to FIG. 7, a spool moving lever shaft 27a is pivotally carried at both ends of it by the camera body. Spool moving levers 27 and 27' which are arranged to be capable of engaging the spool planet lever 14 and a support shaft lever 19 are respectively secured to the upper and lower ends of the spool moving lever shaft 27a. An engaging lever part 27b which is arranged to turn the spool moving levers 27 and 27' clockwise by engaging a release lever 29 as will be described later is formed in one body with the base end part of the spool moving lever 27'. As shown in FIG. 7, the bottom lid 28 is openably and closably attached to the camera body and is turnable on a support shaft 28a. When the bottom lid 28 begins to open by turning around the shaft 28a, the release lever 29 which is disposed at one end part of the bottom lid 28 comes to abut on the engaging lever part 27b of the spool moving lever 27. This causes the spool moving levers 27 and 27' to turn clockwise.

When turning clockwise, the spool moving levers 27 and 27' engage the spool planet lever 14 and the support lever 19, so that the above-stated spool planetary gear mechanism turns counterclockwise against the urging force of the spring 20. As a result, a gap is formed between the spool 17 and the guide roller 21 to permit insertion of the fore end of the film.

Next, the film winding operation of the above-stated arrangement of the embodiment will be described below with reference to FIGS. 8 to 11.

Figure 8:
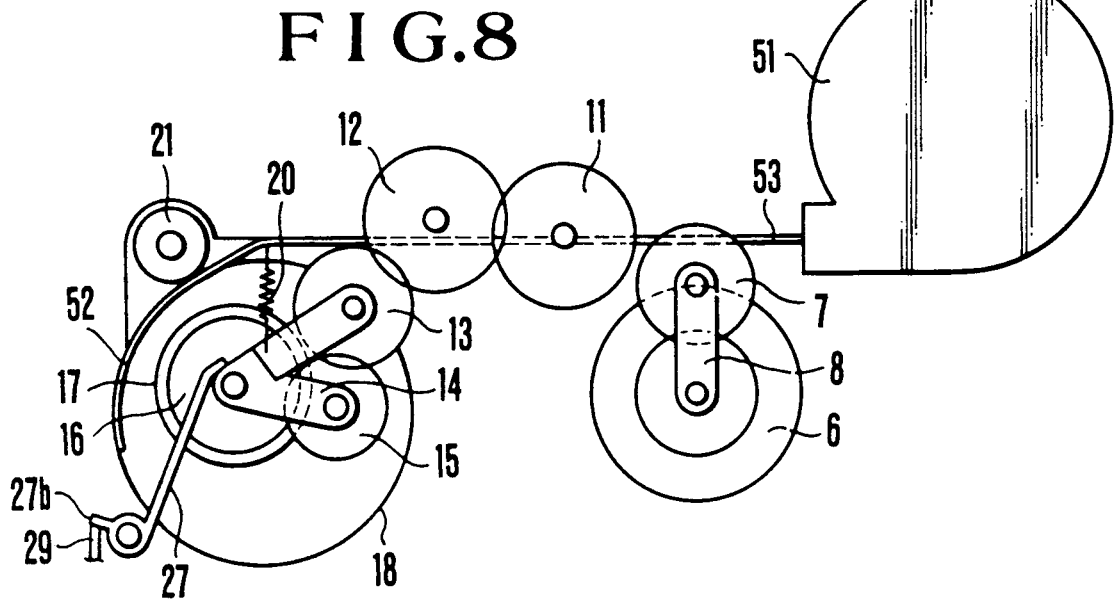
FIG. 8 is a plan view showing the mechanism of FIG. 6 as in a state of having a film cartridge pushed into a cartridge chamber.

FIG. 8 shows the camera upside down as in a state of having a film cartridge 51 taken out after completion of film rewinding, or as in a state of having a film cartridge 51 pushed into a film cartridge chamber from the lower side of the camera body. A reference numeral 52 denotes the fore end part, i.e., the leader part, of a film 53. In this instance, the motor 1 is in a state of having completed its film rewinding action. The planet lever 8 has been turned clockwise. The planet gear 7 is not engaging the idle gear 11. Therefore, when the release lever 29 is caused to push the spool moving lever 27 by the opening movement of the bottom lid 28, the spool sun gear 13 is not restricted (the idle gears 11 and 12 are free). This allows the spool planet lever 14 to turn to bring about a gap between the spool 17 and the guide roller 21. The fore end part 52 of the film 53 thus can be smoothly dropped and inserted between the spool 17 and the guide roller 21.

Figure 9:
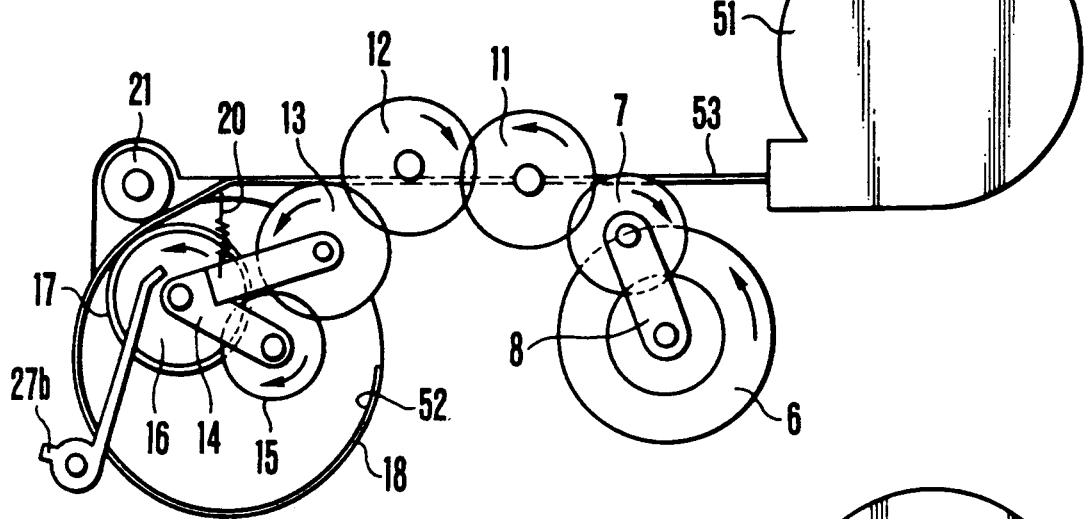
FIG. 9 is a plan view showing the same mechanism as in a state of advancing the film.
Figure 10:
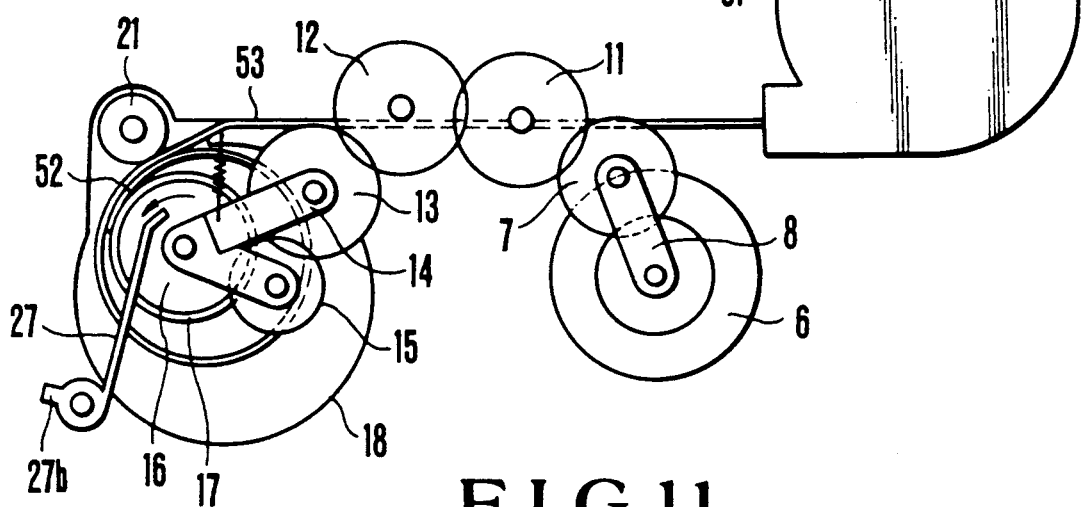
FIG. 10 is a plan view showing the same mechanism as in a state of tightly winding the film.

Next, when the bottom lid 28 is closed as shown in FIG. 9, the fore end part 52 of the film is pinched between the spool 17 and the guide roller 21 by the force of the spring 20. After that, when the motor 1 is rotated counterclockwise to rotate the reduction gear 6 counterclockwise, the spool 17 is also rotated counterclockwise by the gear train consisting of the planet gear 7, the idle gears 11 and 12, the spool sun gear 13, the idle gear 15 disposed on the spool planet lever 14 and the spool planet gear 16. With the spool 17 rotated in this manner, the fore end part 52 of the film is moved into the spool chamber 18 along the inner circumferential wall thereof by the frictional force of the spool 17.

With the leader part (or the fore end part) 52 of the film thus taken up onto the spool 17 approaching the end of a first turn around the spool 17, when the fore end 52 of the film comes to meet a second turn portion of the film, the fore end part 52 of the film is wound around the spool 17 to have the film tightly wound, because the periphery of the spool 17, the second turn portion of the film and the fore end part 52 of the film are all moving in one and the same direction.

Figure 11:
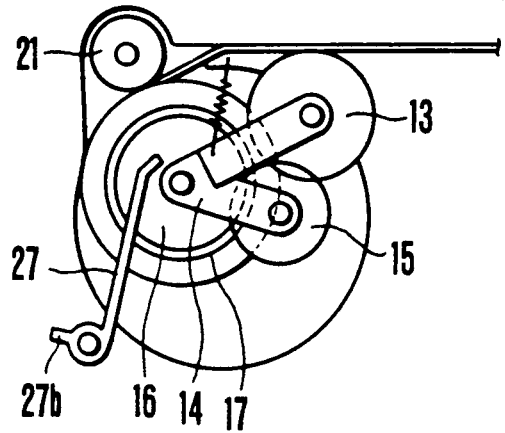
FIG. 11 is a plan view showing the same mechanism as in a state of having the film taken up to a certain extent.

FIG. 11 shows the spool as in a state of having taken up a certain amount of film under this condition.

Figure 14:
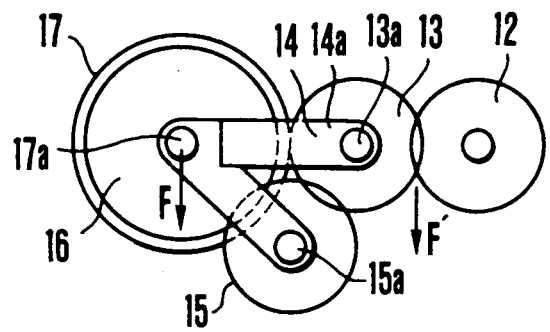
FIG. 14 shows the operation of the same camera when an impact is inflicted on the mechanism of FIG. 6.

In the film winding mechanism of the embodiment, the spool 17 behaves when an impact is inflicted on the camera as described below with reference to FIG. 14.

Assuming that the force F of the impact is applied to the center of the spool 17, the force F urges the spool planet gear 16 and the spool idle gear 15 to revolve counterclockwise around the shaft 13a. As a result, a reaction force F' which is produced through the idle gear 12 is exerted on the sun gear 13 in the direction of an arrow to prevent the sun gear 13 from rotating.

With the rotation of the sun gear 13 thus restricted, the spool idle gear 15 which has been revolving counterclockwise comes to rotate counterclockwise. This causes the spool planet gear 16 to rotate in the clockwise direction which is reverse to the film winding direction. As a result, the film is prevented from being wound by a revolving movement of the spool 17.

The film is allowed to be wound only to a negligible degree by the revolution of the spool 17 resulting from the turning movement of the spool planet lever 14, because: The moving direction of the spool 17 on the spool planet lever 14 differs from the film pulling-out direction and the amount of film pulled out is less than the moving degree of the center of the spool 17. Therefore, by taking advantage of this, the center 14a of the spool planet lever 14 and the film pulling-out opening 18a of the film cartridge are set in such a way as to have the amount of cancelling due to the above-stated rotation of the spool 17 correspond to the amount of film that is pulled out.

In other words, when an impact F is inflicted, the spool planet lever 14 turns counterclockwise. At the same time, the spool 17 also revolves while rotating. In this instance, the rotating direction of the spool 17 is the film rewinding direction. Meanwhile, the revolving direction of the spool 17 is a direction in which the film is pulled out from the film cartridge. Therefore, if the film is pulled out in a greater amount by the revolution of the spool 17 than the amount of film rewound by the rotation of the spool 17, the film would be pulled out too much.

The film portion to be wound onto the spool 17 is taken up onto the spool 17 through the pulling-out opening 18a of the cartridge 18 in a slanting state. Therefore, the amount of pulled-out film is less than the moving degree of the spool 17 due to its revolution by an amount corresponding to the slanting degree. This means that the film can be prevented from being pulled out with the amount of film rewound by the rotation of the spool 17 arranged to be equal to the amount of film pulled out by the revolution of the spool 17 as these amounts offset each other. In view of this, the center 14a of the spool planet lever 14 and the film pulling-out opening 18a are set in such a way as to have the above-stated amount of pulled-out film. The embodiment thus makes the above-stated problem virtually ignorable.

It is ideal to make the amount of film rewound by the rotation of the spool 17 equal to the amount of film pulled out by the revolution of the spool 17 as mentioned above. In actuality, however, the embodiment is arranged to slacken the film, for the sake of safety, by arranging the amount of film pulled out due to the revolution of the spool 17 to be greater.

Therefore, the film portion on the photographing image plane of the camera never moves while the slack of film takes place at the entrance of the spool chamber 18. This film slack is removed by a next process of film winding and is ignorable as it presents no problem.

Figure 15:
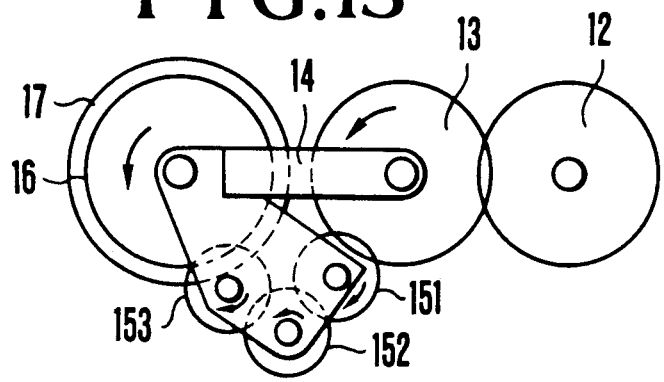

In the embodiment described above, the spool mechanism is arranged to be a planetary gear mechanism consisting of three gears 13, 15 and 16. This arrangement, however, may be changed as shown in FIG. 15 or 16. In the modification shown in FIG. 15, the spool mechanism is arranged to be a planetary gear mechanism consisting of five gears 13, 151, 152, 153 and 16. In the case of FIG. 16, the spool mechanism is arranged to be a planetary gear mechanism consisting of seven gears 13, 154, 155, 156, 157, 158 and 16. In short, the spool mechanism can be changed as desired as long as it is a planetary gear mechanism consisting of an odd number of gears.

Further, as shown in FIGS. 6 and 12, the guide roller 21 of the invented camera is provided with an encoder 30 for indexing an amount of fed film. The degree of rotation of the guide roller 21 is arranged to be detected by means of a photo-coupler 31. In other words, the guide roller 21 of the film winding mechanism is arranged to serve also as a member for detecting the amount of fed film. In the light of a film feeding amount detection system, the spool 17 is arranged to act also as a pressing roller which comes into pressed contact with the guide roller 21. This arrangement thus contributes to simplification of the film feeding amount detection system by preventing an increase in the number of parts required.

The viewfinder optical system is surrounded with the motor 1 (below), the idle gear 5 (side), the idle gears 11 and 12 (above) and the spool sun gear 13 (side), The arrangement of these parts permits reduction in the size of the camera.

Figure 17:
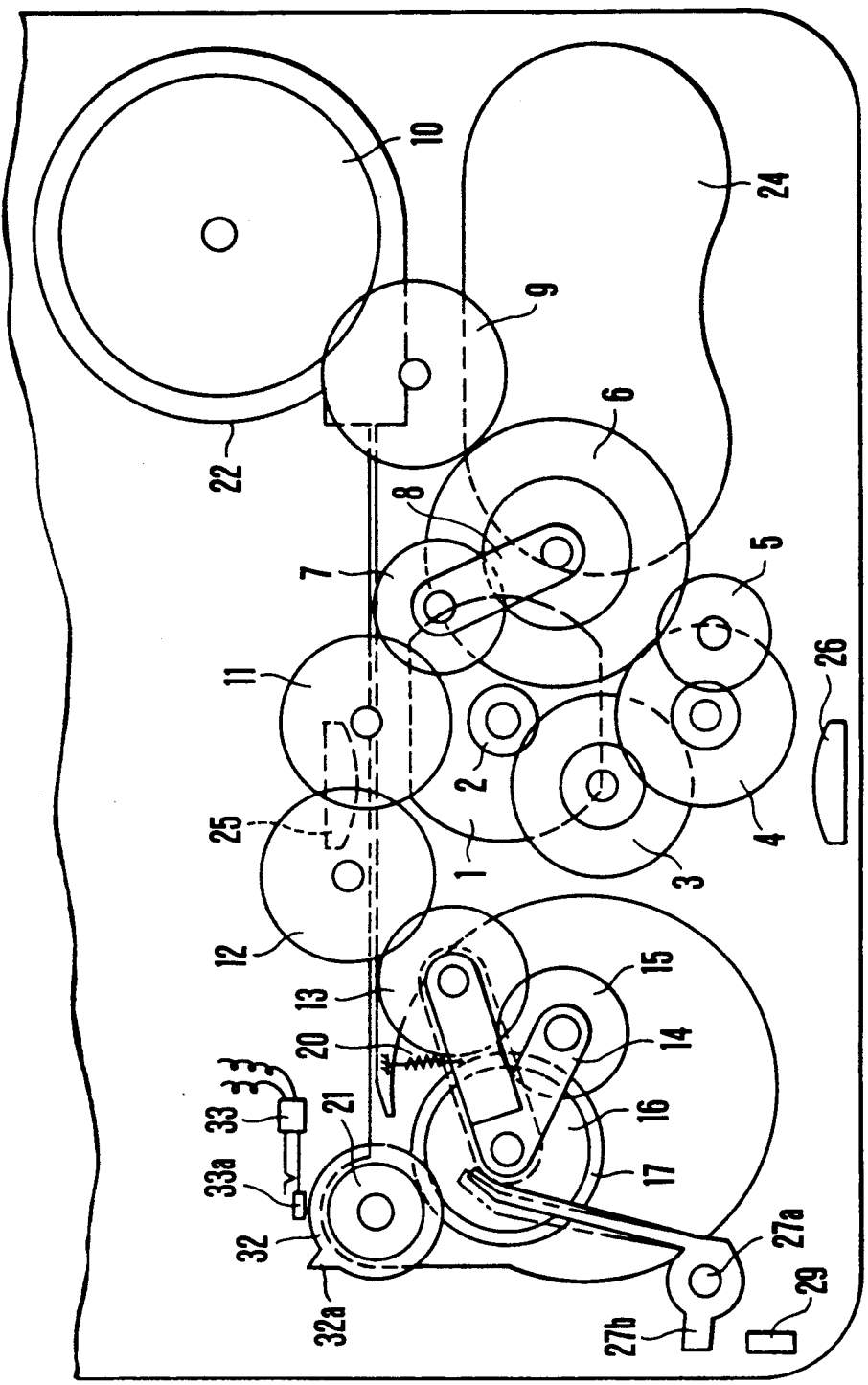
FIG. 17 is a plan view showing a film winding and rewinding mechanism arranged as another embodiment of this invention.

FIG. 17 shows in a plan view the film winding and rewinding mechanism of a camera arranged as another embodiment of this invention. In the embodiment described in the foregoing, the index of the amount of fed film is arranged to be detected by the encoder 30 mounted on the guide roller 21 in conjunction with the photo-coupler 31. Whereas, in the case of the embodiment shown in FIG. 17, a rotary disc 32 having a projection 32a on its circumferential face is secured to the guide roller 21. A mechanical switch 33 is arranged to turn on a switch signal from its off-state when one contact piece 33a of the switch 33 is pushed by the projection 32a. After that, the amount of fed film is detected by detecting a point at which the switch signal is turned off. While the rotary disc 32 is provided with only one projection 32a as shown in FIG. 17, the rotary disc 32 may be changed to have a plurality of projections 32a to count an amount which is a plural number times as great as the amount counted by the arrangement of FIG. 17. In FIG. 17, all the parts that are arranged in the same manner as those of FIG. 6 are indicated by the same reference numerals.

Figure 18:
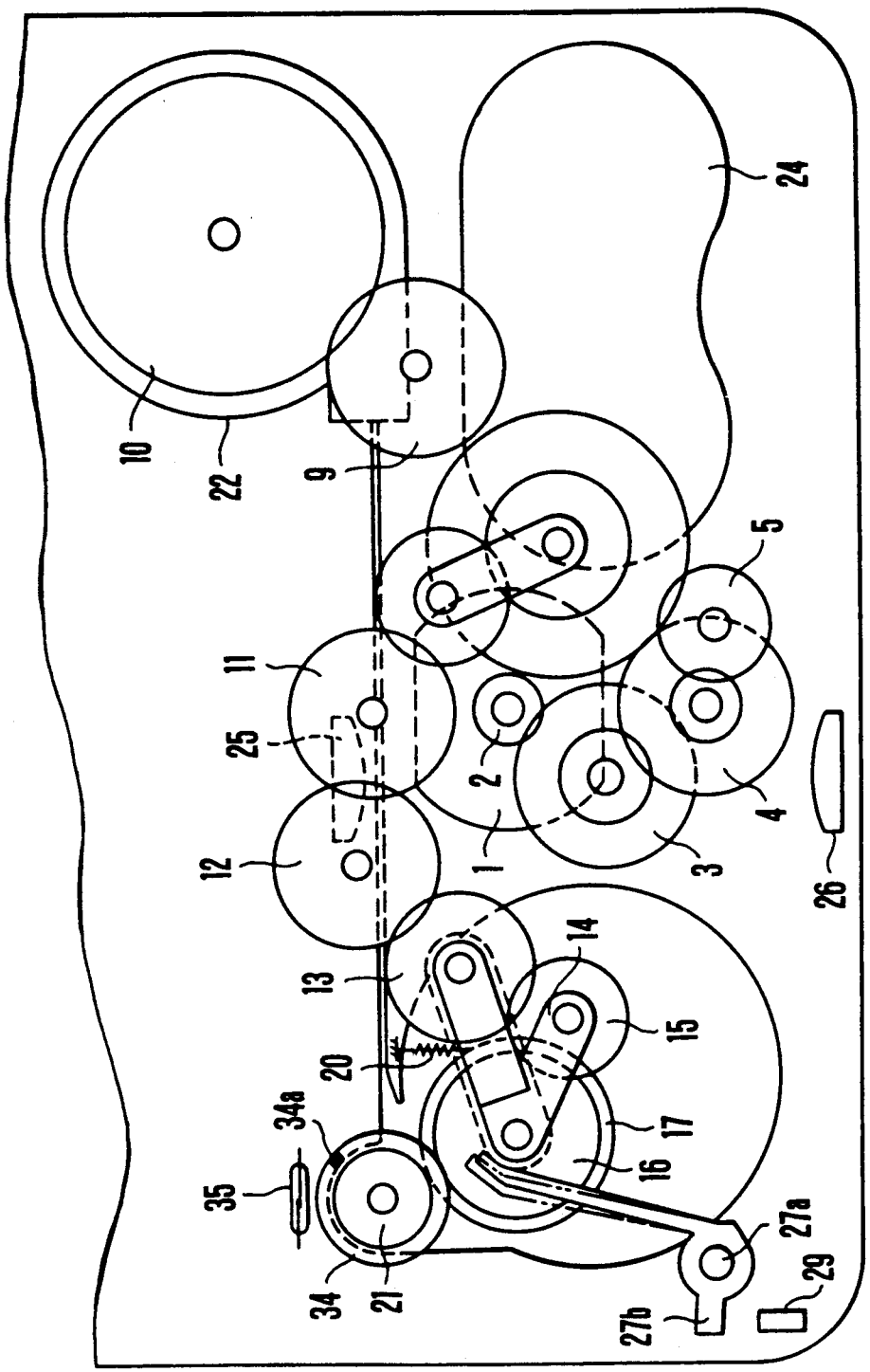
FIG. 18 is a plan view showing a film winding and rewinding mechanism arranged as a further embodiment of the invention.

FIG. 18 shows in a plan view the film winding and rewinding mechanism of a camera arranged according to this invention as a further embodiment thereof. In this case, a magnet plate 34 which has a magnet 34a attached to a part of it is secured to the guide roller 21. A reed switch 35 is arranged to detect arrival of the magnet 34a at a given point. By this, the number of turns made by the guide roller 21 is counted. A piezoelectric element may be used in place of the reed switch 35. In FIG. 18, all the parts that are arranged in the same manner as those of FIG. 6 are indicated by the same reference numerals.

Figure 19:
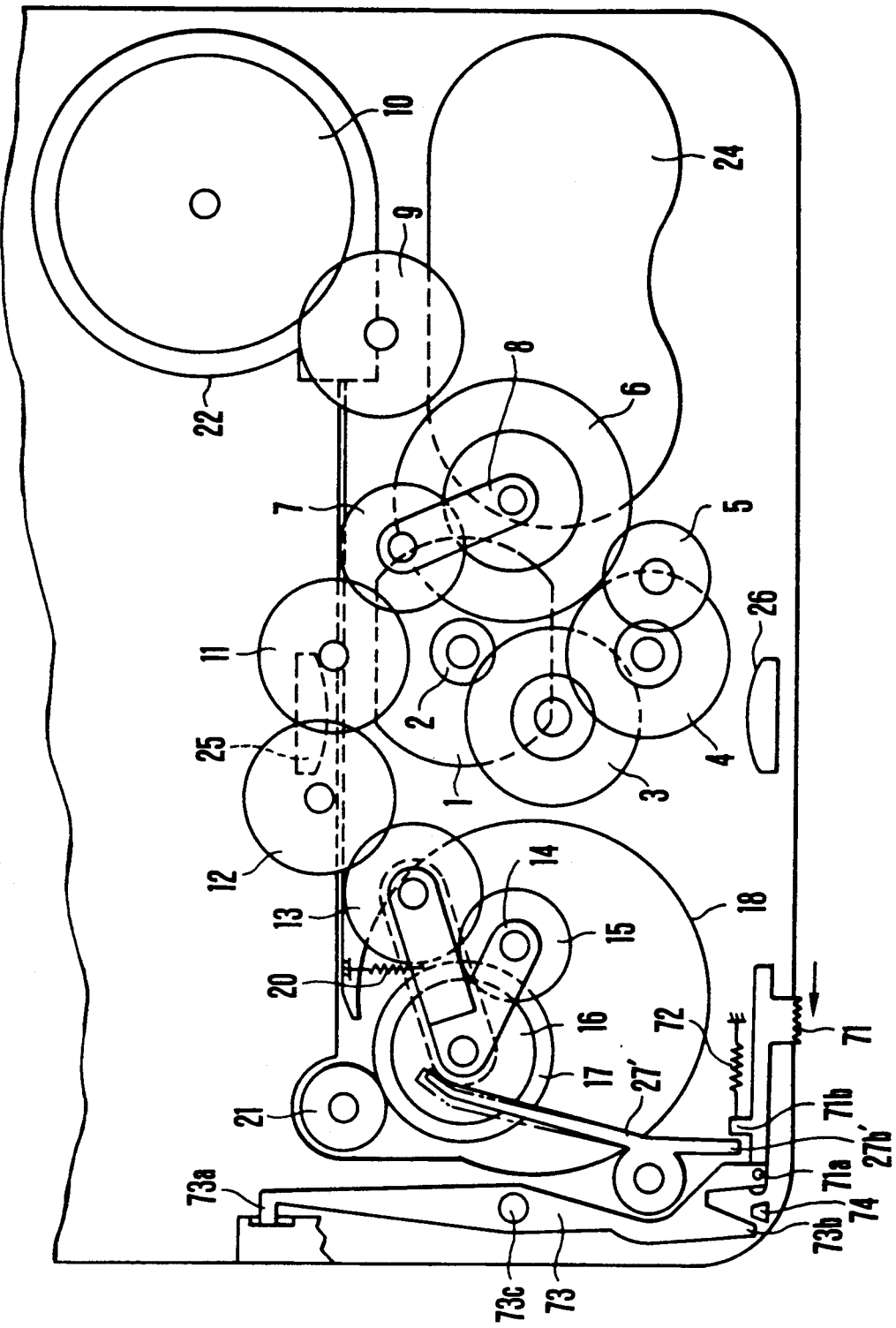
FIG. 19 is a plan view showing a film winding and rewinding mechanism arranged as a further embodiment of the invention.

FIG. 19 shows in a plan view the film winding and rewinding mechanism of another camera arranged also as a further embodiment of the invention. All the parts that are arranged in the same manner as those shown in FIG. 6 are indicated by the same reference numerals. In the case of this embodiment, the spool moving lever 27 is arranged to be operated by a sliding movement of a bottom lid opening-closing knob 71. The bottom lid opening-closing knob 71 is held by a holding pin 74 which is arranged to be moved by the opening movement of the bottom lid. By this, the spool moving lever 27 is held in its operated position to provide a space between the spool 17 and the guide roller 21 for allowing the fore end of the film to be inserted into the space. In FIG. 19, all the parts that are arranged in the same manner as those of FIG. 6 are indicated by the same reference numerals.

In this case, the bottom lid is also disposed in the bottom part of the camera body in the same manner as in the case of the preceding embodiments. The bottom lid opens and closes by using as a fulcrum the support shaft provided on the rear side of the camera body. A lock point at which the bottom lid is locked to the camera body is located at a front part on one side of the camera body. A lock part 73a is formed at one end of a bottom lid opening lever 73 which is arranged to be turnable on a fulcrum pin 73c. The bottom lid is locked to the camera body with the bottom lid locked by the lock part 73a.

The other end of the bottom lid opening lever 73 is in a forked shape. One branch part of the forked end of the lever 73 is linked via a pin 71a with the bottom lid opening-closing knob 71 which is arranged to be slidingly operated. The other branch part of the forked end is formed into a lock part 73b. The lock part 73b is arranged to keep the bottom lid opening lever 73 in its opening position by engaging the holding pin 74 which is provided on the bottom lid when the pin 74 is brought into the forked part of the lever 73 by the opening movement of the bottom lid.

The bottom lid opening-closing knob 71 is urged to be in its closed position by a return spring 72. The knob 71 is provided with an engaging projection 71b which is arranged to engage the engaging lever part 27b' of the spool moving lever 27'. When the knob 71 is slidden in the direction of an arrow, the engaging projection 71b engages the engaging lever part 27b' to cause the spool moving lever 27' to turn clockwise in the same manner as in the case of the embodiment described in the foregoing. The clockwise movement of the lever 27' moves the spool 17 away from the guide roller 21 and, at the same time, causes the bottom lid opening lever 73 to turn clockwise to unlock the bottom lid. This allows the bottom lid to open. With the bottom lid opened, the holding pin 74 engages the lock part 73b to prevent the bottom lid opening-closing knob 71 from returning to its lid closing position. Therefore, the gap space which is obtained between the spool 17 and the guide roller 21 can be left as it is after a knob operating finger is detached from the knob 71.

When the bottom lid is closed after completion of film loading, the holding pin 74 retreats to allow the lid opening lever 73 and the lid opening-closing knob 71 to resume their closing positions. At the same time, the spool 17 is pushed against the guide roller 21 to permit film winding.

Figure 20:
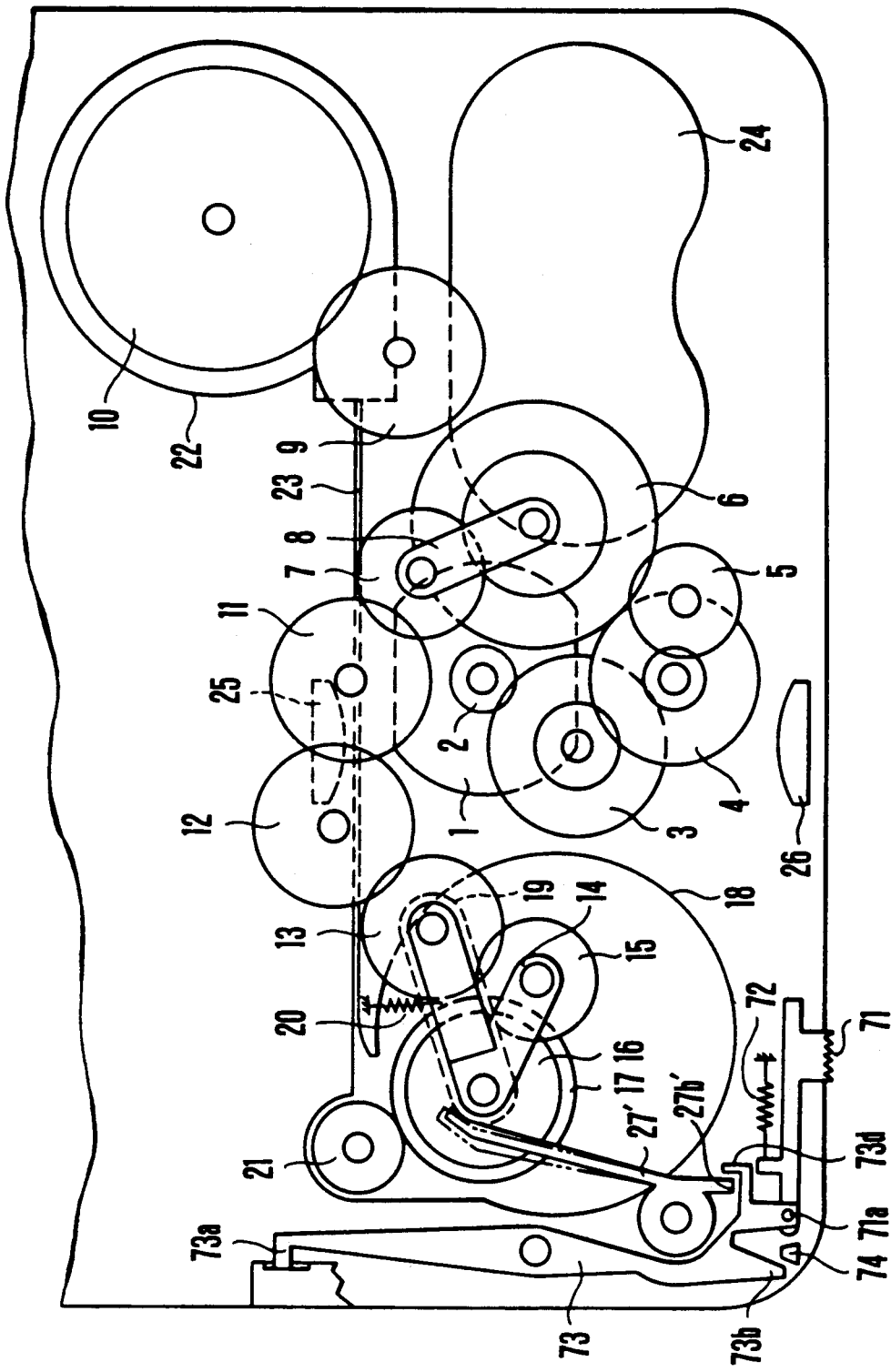
FIG. 20 is a plan view showing a film winding and rewinding mechanism arranged as a further embodiment of the invention.

FIG. 20 shows in a plan view the film winding and rewinding mechanism of a camera arranged according to this invention as a further embodiment thereof. In FIG. 20, all the parts arranged in the same manner as those of the embodiment shown in FIG. 6 are indicated by the same reference numerals. In the case of this embodiment, the bottom lid opening lever 73 is provided with an operation part 73d which is arranged to move the spool moving lever 27'. This operation part 73d is operated to move the spool 17 away from the guide roller 21 for easy insertion of the fore end of the film into the spool chamber 18.

Figure 23:
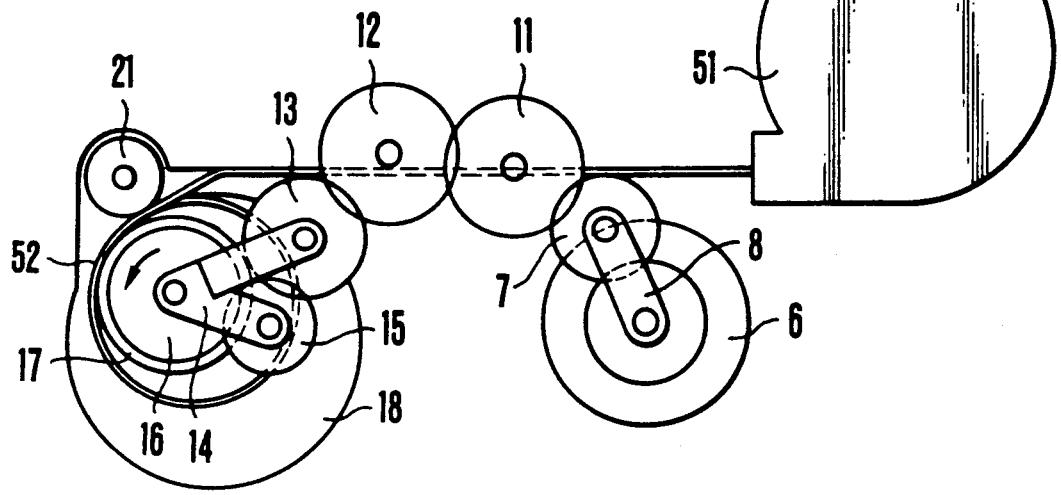
Figure 24:
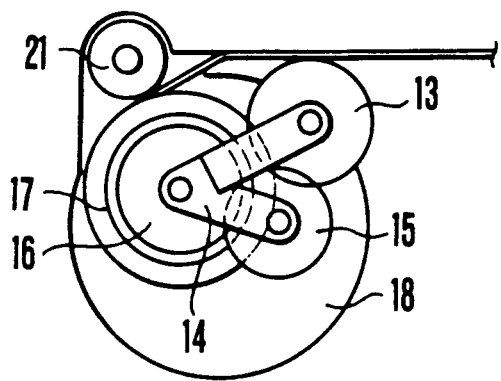

FIGS. 21 to 24 are plan views showing a film winding and rewinding mechanism arranged also according to this invention as a further embodiment thereof. In these figures, all the parts that are arranged in the same manner as those of the embodiment shown in FIG. 6 are indicated by the same reference numerals. Among these figures, FIG. 21 shows the mechanism as in a state of having the fore end of the film inserted; FIG. 22 shows it as in a state of having the film further advanced; FIG. 23 shows it as in a state of having the film tightly wound onto the spool; and FIG. 24 shows it as in a state of having the film wound in a coil onto the spool.

Referring to FIG. 21, an urging means for pushing the spool 17 against the guide roller 21 is arranged in a manner different from that of FIG. 6. More specifically, the urging force of a spring is not directly exerted on the spool planet lever 14. In this case, there is provided an urging lever 127 which is arranged to be turned clockwise by the opening movement of the bottom lid and counterclockwise by the closing movement of the bottom lid. An urging spring 128 is attached to the urging lever 127. The spring 128 is arranged to cause the spool 17 to be pushed against the guide roller 21 when winding the film with the bottom lid closed. In the case of the illustration of FIG. 21, the bottom lid which is not shown is opened. The film cartridge 51 is inserted from the direction corresponding to the reverse side of the paper of the drawing to push the fore end 52 of the film 53 into a gap between the spool 17 and the guide roller 21. At that time, the planet gear 7 of a first planetary gear mechanism is located either on the film rewinding side or at a neutral point. Since the planet gear 7 is not engaging the idle gear 11 connected to the spool planetary gear mechanism, the spool planetary gear mechanism can freely make a planetary motion (the revolution on the axis of the spool sun gear 13). The spool 17 is also freely revolvable. The spool 17 thus can be caused to make a planetary motion by pushing it with a weak force. The spool 17 is arranged to be swingable to its guide roller contacting position over a distance including the center of the spool chamber 18.

FIG. 22 shows the embodiment as in the initial stage of the automatic film loading operation with the spool 17 acting as a film feeding roller. When the bottom lid is closed under the condition of FIG. 21, the urging force of the spring 128 causes the urging lever 127 to turn counterclockwise. The spool planetary gear mechanism acts to push the spool 17 against the guide roller 21. Then, when the motor 1 is rotated counterclockwise, the planet gear 7 comes to engage the idle gear 11 to cause the spool 17 to rotate counterclockwise.

The spool 17 is coated with a friction rubber material in the same manner as shown in FIG. 13. With the spool being pushed by the force of the urging spring 128 against the film 53, the fore end 52 of the film is moved along the inner circumferential wall of the spool chamber 18 by the rotation of the spool caused by the motor 1 in conjunction with the friction of the rubber coating. When the film makes one turn along the inner circumference of the spool chamber 18, the film begins to be tightly coiled on the spool as shown in FIG. 22.

At this moment, an angle α formed by the turning center 13a of the spool planet lever 14, the center 17a of the spool 17 and the center 21a of the guide roller 21 is larger than 90 degrees. This allows the rotating force of the spool 17 to act as the biting force of a planet gear and exerts a frictional force on the film 53. This thus results in a film feeding force. The adverse effect of the curling of the film 53 is negligible as the guide roller 21 is positioned in close vicinity to the aperture, so that the film 53 can be readily inserted between the spool 17 and the guide roller 21.

The tight coiling process of FIG. 23 is accomplished by virtue of little friction between film parts and great friction between the film and the friction rubber 17c of the spool 17. This allows the fore end 52 of the film to be tightly taken up along the outer circumference of the spool 17. At this time, the fore end 52 of the film is taken in between the second turn portion of the film and the spool 17 at a natural angle.

FIG. 24 shows the embodiment as in a stationary state after the film is taken up and tightly coiled on the spool.

Figure 25:
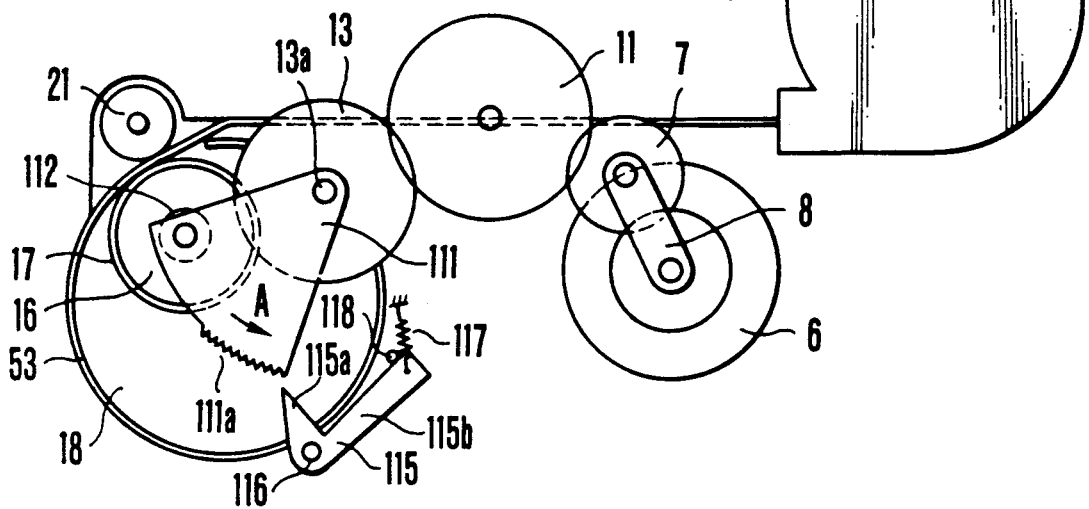
FIG. 25 is a plan view showing a film winding and rewinding mechanism arranged as a further embodiment of the invention.

FIG. 25 shows in a plan view the film winding and rewinding mechanism of a camera arranged as a further embodiment of this invention. All the parts that are arranged in the same manner as those shown in FIG. 6 are indicated by the same reference numerals. In the case of this embodiment, the urging force for pushing the spool 17 against the guide roller 21 is obtained from a friction member provided at the planet gear or the sun gear instead of a spring. The planetary gear mechanism for the spool 17 is arranged to be consisting of two gears including the sun gear 13 and the planet gear 16. A friction washer 112 is disposed between the planet gear 16 and a planet gear lever 111, and the spool 17 is pushed against the guide roller 21 by the turning force of the lever 111.

At that moment, the idle gear 11 which is engaging the planet gear 7 of the first planetary gear mechanism directly engages the sun gear 13 of the planetary gear mechanism for the spool 17.

This friction type planetary gear mechanism necessitates some protection against an impact caused by the fall of the camera or the like. To meet this requirement, an impact preventing lever 115 is urged counterclockwise by a weak spring 117. The lever 115 is provided with a plunging claw 115a and a weight part 115b. A stopper 118 is arranged to have the plunging claw 115a located in close vicinity to a saw-tooth part 111a formed on the planet lever 111. The weight part 115b is arranged in such a way as to have the center of gravity of the impact preventing lever 115 which is at a shaft 116 approximately in an inverse relation to that of the planetary gear mechanism which is located at the shaft 13a of the planet lever 111. The arrangement is such that the plunging claw 115a plunges into the saw-tooth part 111a the instant the planetary gear mechanism is caused by an impact to turn counterclockwise to prevent abnormal advancement of film.

In other words, with an impact inflicted on the camera body, when the force of impact is exerted in the direction of an arrow A as shown in FIG. 25, the spool 17, etc. are unbalanced. This urges the spool 17 and the planet lever 111 to turn (revolve) counterclockwise. However, at the same time, the weight part 115b causes the impact preventing lever 115 to turn clockwise against the spring force of the spring 117. The plunging claw 115a is thus caused to engage the saw-tooth part 111a to prevent the planet lever 111 from being turned (revolved) by the impact.

Without the above-stated arrangement, an impact on the camera would cause the spool 17 to revolve to cause accidental film winding. Whereas, the above stated arrangement of the embodiment effectively prevents the planet lever 111 from being turned by the impact, so that the film can be prevented from being pulled out and wound onto the spool.

Further, the impact preventing lever 115 is arranged to be abutting on the stopper 118 and is kept in a position to have its plunging claw 115a normally kept in a stand-by position, which is in the vicinity of the saw-tooth part 111a of the planet lever 111 but is away from the part 111a beyond the working stroke thereof.

Figure 26:
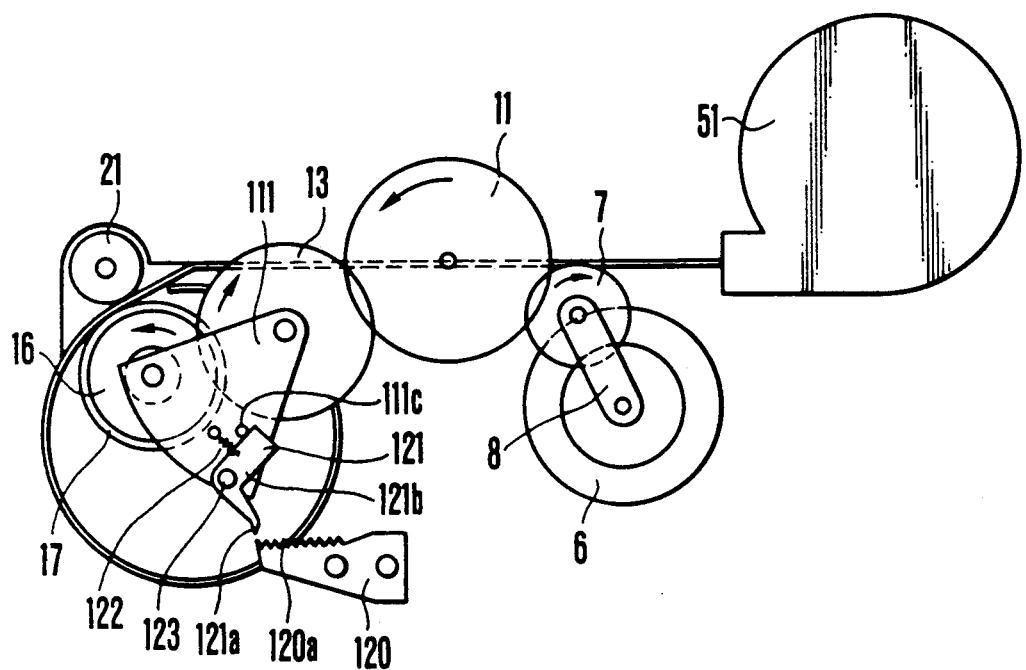
FIG. 26 shows another example of the mechanism of FIG. 25.

FIG. 26 shows by way of example a modification of the embodiment shown in FIG. 25. In the case of FIG. 25, the planet lever 111 is provided with the saw-tooth part 111a; and, on the side of the camera body, the impact preventing lever 115 is provided with a plunging claw which is arranged to engage the saw-tooth part 111a. Whereas, in the case of this modification, an impact preventing lever 121 which is provided with a plunging claw 121a is arranged on the planet lever 111 to be turnable on a pin 123. Meanwhile, a ratchet plate 120 which is provided with a saw-tooth part 120a is secured to the camera body. The impact preventing lever 121 includes a weight part 121b which, like in the case of FIG. 25, extends to one end of the lever opposite to the other end having the plunging claw. A weak spring 122 is disposed between the end of this weight part 121b and the camera body. This spring 122 exerts a spring force on the lever 121 to urge the latter to move counterclockwise and in the direction of moving the plunging claw 121a away from the saw-tooth part 120a. Further, the impact preventing lever 121 has its counterclockwise turning movement restricted by a stopper pin 111c which is erected on the planet lever 111 in such a way as to have the plunging claw 121a in a stand-by position in close vicinity to one end of the saw-tooth part 120a as shown in FIG. 26. Meanwhile, the saw-tooth part 120a is arranged to be in a normally inoperative position beyond reach of the stroke of the plunging claw 121a.

Figure 27:
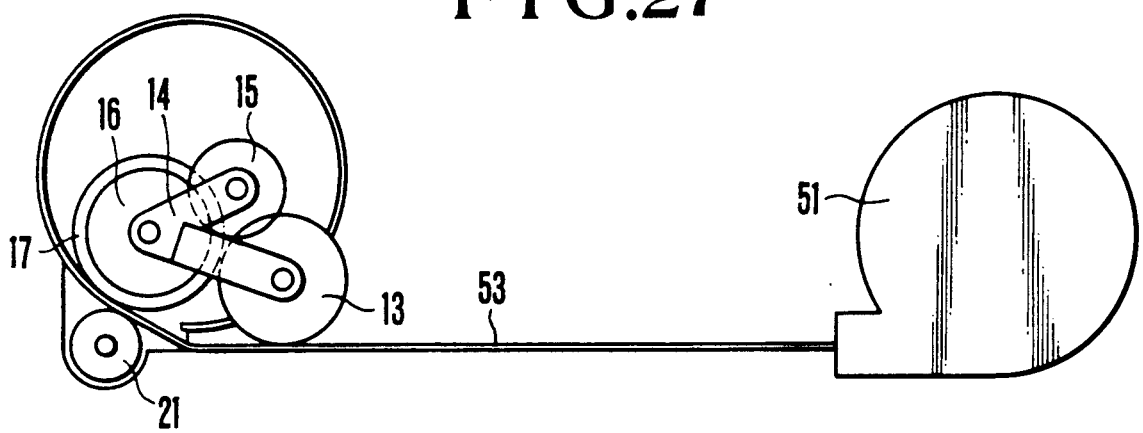
FIG. 27 is a plan view showing a film winding and rewinding mechanism arranged as a still further embodiment of the invention.

FIG. 27 shows in a plan view another modification example of the film winding and rewinding mechanism shown in FIG. 25. In FIG. 27, all the parts that are arranged in the same manner as those of FIG. 6 are indicated by the same reference numerals. In the case of this modification, the film winding and rewinding mechanism of the embodiment shown in FIG. 6 is applied to a forward winding direction type camera instead of a reverse winding direction type camera. In this instance, the lateral size, that is, the width of the camera is about the same as that of the conventional camera.

What is claimed is:

1. A camera of the kind arranged to wind a film onto a spool in a reverse winding direction, comprising:
   (a) a spool for taking up the film in the reverse winding direction;
   (b) a guide member; and
   (c) position changing means for changing a position of said spool to cause the film to be inserted and pinched between said spool and said guide member so that the film is advanced by a driving force of said spool.

2. A camera according to claim 1, further comprising loading means for loading said camera with the film from a bottom side of said camera.

3. A camera according to claim 2, wherein said loading means includes means for changing a position of said spool in a direction of moving said spool away from said guide member in response to a film loading operation.

4. A camera according to claim 2, wherein said loading means includes a cutaway part disposed on one side of said camera.

5. A camera according to claim 4, wherein said cutaway part includes a part which is wider than a diameter of a cartridge of the film to be loaded.

6. A camera according to claim 4, wherein said loading means includes a slanting face which spreads toward a rear of said camera and becomes wider accordingly as said slanting face comes nearer to a lower side of said camera.

7. A camera according to claim 6, wherein said loading means includes a groove part arranged to have the film fitted therein in loading the film, said groove part being formed continuously from said slanting face.

8. A camera according to claim 4, wherein said loading means includes a groove part arranged to have the film fitted therein in loading the film, said cutaway part being cut out down to a level lower than an opening end edge of said groove part.

9. A camera according to claim 4, wherein said loading means includes a stowing chamber for stowing a cartridge of the film to be loaded, said stowing chamber having said cutaway part cut out down to a depth which is about ⅓ of said stowing chamber.

10. A camera according to claim 1, wherein said position changing means includes urging means for urging said spool to move toward said guide member.

11. A camera according to claim 1, wherein said spool is provided with a friction member which is applied to an outer circumferential face of said spool.

12. A camera according to claim 1, wherein said guide member includes a roller arranged to come into contact with the film.

13. A camera according to claim 1, wherein said position changing means includes planetary gear means for changing a position of said spool.

14. A camera according to claim 1, wherein said position changing means includes support means for supporting two ends of said spool.

15. A camera according to claim 1, wherein said guide member is disposed on a line extending to an exposure plane.

16. A camera according to claim 1, further comprising a spool chamber arranged to house said spool, said guide member being disposed in close vicinity to an entrance of said spool chamber.

17. A camera according to claim 13, wherein said planetary gear means includes means for making a rotating direction of said spool coincide with a rotating direction of a sun gear.

18. A camera according to claim 1, wherein said position changing means includes preventing means for preventing said spool from moving away from said guide member when an inertia force is exerted on said spool in a direction of moving said spool away from said guide member.

19. A camera according to claim 18, wherein said preventing means includes restricting means arranged to have said preventing means normally remain inoperative.

20. A camera according to claim 18, wherein said preventing means includes locking means arranged to be operated by an inertia force.

21. A camera according to claim 2, wherein said loading means includes a cartridge chamber for housing a cartridge of the film to be loaded, said camera further comprising and a battery chamber arranged behind said cartridge chamber to house a power source battery therein.

22. A camera according to claim 21, further comprising a spool chamber for housing said spool, and a motor for feeding the film, said motor being disposed between said spool chamber and said battery chamber.

23. A camera according to claim 2, wherein said loading means includes a cartridge chamber for housing a cartridge of the film to be loaded, said cartridge chamber being disposed in front of an exposure plane.

24. A camera according to claim 23, further comprising a spool chamber for housing said spool, said spool chamber being disposed behind said exposure plane.

25. A camera according to claim 24, further comprising a battery chamber arranged in the rear of said cartridge chamber to house a power source battery therein, said battery chamber being disposed in the rear of said exposure plane.

26. A camera according to claim 25, further comprising a motor for feeding the film, said motor being disposed behind said exposure plane and between said spool chamber and said battery chamber.

27. A camera according to claim 1, further comprising detecting means for detecting the amount of feeding of the film, said detecting means being disposed at said guide member.

28. A camera according to claim 27, wherein said detecting means includes optical detecting means.

29. A camera according to claim 12, further comprising detecting means for detecting the amount of feeding of the film, said means being interlocked with said roller.

30. A camera according to claim 29, wherein said detecting means includes optical detecting means.

31. A camera according to claim 19, wherein said restricting means includes an elastic member.

32. A camera according to claim 1, further comprising means for changing a position of said spool in a direction of moving said spool away from said guide member in response to a film loading operation.

33. A camera according to claim 1, further comprising a cartridge chamber for housing a cartridge of the film to be loaded, and a battery chamber for housing a power source battery, said battery chamber being disposed behind said cartridge chamber.

34. A camera according to claim 33, further comprising a spool chamber for housing said spool, and a motor for feeding the film, said motor being disposed between said spool chamber and said battery chamber.

35. A camera according to claim 1, further comprising a cartridge chamber for housing a cartridge of the film to be loaded, said cartridge chamber being disposed in front of an exposure plane.

36. A camera according to claim 35, further comprising a spool chamber for housing said spool, said spool chamber being disposed behind said exposure plane.

37. A camera according to claim 36, further comprising a battery chamber arranged behind said cartridge chamber to house a power source battery therein, said battery chamber being disposed behind said exposure plane.

38. A camera according to claim 37, further comprising a motor for feeding the film, said motor being disposed in the rear of said exposure plane and between said spool chamber and said battery chamber.

39. A camera comprising:
(a) a spool for taking up a film;
(b) a guide member;
(c) position changing means for changing a position of said spool to cause the film to be inserted and pinched between said spool and said guide member so that the film is advanced by a driving force of said spool; and
(d) loading means for loading said camera with the film from a bottom side of said camera.

40. A film feeding device comprising:
(a) a spool for taking up a film in a reverse winding direction;
(b) a guide member; and
(c) position changing means for changing a position of said spool to cause the film to be inserted and pinched between said spool and said guide member so that the film is advanced by a driving force of said spool.

41. A film feeding device comprising:
(a) a spool for taking up a film;
(b) a guide member;
(c) position changing means for changing a position of said spool to cause the film to be inserted and pinched between said spool and said guide member so that the film is advanced by a driving force of said spool; and
(d) loading means for loading said camera with the film from a bottom side of said camera.

* * * * *

UNITED STATES PATENT AND TRADEMARK OFFICE
CERTIFICATE OF CORRECTION

PATENT NO. : 5,008,693

DATED : April 16, 1991

INVENTOR(S) : Michio Hirohata

It is certified that error appears in the above-identified patent and that said Letters Patent is hereby corrected as shown below:

Column 14, line 63, "in the rear of " should read --behind--.

Signed and Sealed this

Twenty-sixth Day of January, 1993

*Attest:*

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO. : 5,008,693
DATED : April 16, 1991
INVENTOR(S) : Michio Hirohata

It is certified that error appears in the above-indentified patent and that said Letters Patent is hereby corrected as shown below:

COLUMN 14:

Line 46, "and" should be deleted.

Signed and Sealed this

Fourteenth Day of June, 1994

*Attest:*

BRUCE LEHMAN

*Attesting Officer*    *Commissioner of Patents and Trademarks*